(12) United States Patent
Sato (10) Patent No.: US 6,353,456 B1
(45) Date of Patent: *Mar. 5, 2002

(54) COMMUNICATION TERMINAL AND COMMUNICATION CONFERENCE SYSTEM

(75) Inventor: Eiichi Sato, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/760,206

(22) Filed: Dec. 4, 1996

Related U.S. Application Data (63) Continuation of application No. 08/297,169, filed on Aug. 29, 1994.

(30) Foreign Application Priority Data

Aug. 30, 1993 (JP) ............................................. 5-214377
Aug. 24, 1994 (JP) ............................................. 6-199674

(51) Int. Cl.[7] ................................................. H04N 7/15
(52) U.S. Cl. .................................. 348/14.08; 348/14.09
(58) Field of Search .......................... 348/14–17, 14.08, 348/14.09; 379/90.01, 93.01, 93.02, 93.03, 93.17, 93.21, 100.01, 202, 203, 202.01, 204.01; H04N 7/15

(56) References Cited

U.S. PATENT DOCUMENTS

| | | | | |
|---|---|---|---|---|
| 4,650,929 A | * | 3/1987 | Boerger et al. | 348/15 |
| 4,805,205 A | * | 2/1989 | Faye | 379/96 |
| 5,003,532 A | * | 3/1991 | Ashida et al. | 348/15 |
| 5,061,992 A | * | 10/1991 | Ueno | 348/15 |
| 5,095,196 A | * | 3/1992 | Miyata | 235/382 |
| 5,414,457 A | * | 5/1995 | Kadowaki et al. | 348/14 |
| 5,440,624 A | * | 8/1995 | Schoof, II | 379/202 |

FOREIGN PATENT DOCUMENTS

| | | | | |
|---|---|---|---|---|
| GB | 2223911 | * | 4/1990 | 379/53 |
| JP | 6-225302 | * | 8/1994 | H04N/7/15 |

* cited by examiner

Primary Examiner—Stella Woo
(74) Attorney, Agent, or Firm—Fitzpatrick, Cella, Harper & Scinto (57) ABSTRACT

Disclosed is an apparatus in which conference participant proper information (e.g., a company name, a post, and a name printed on a name card) is read by an optical character reader (74), and the read name card data is transmitted, as conference participant proper information, to a partner's station in a television conference so that there is no need to set an occasion for self-introduction.

24 Claims, 9 Drawing Sheets

COMMUNICATION TERMINAL AND COMMUNICATION CONFERENCE SYSTEM

This application is a continuation, of Application No. 08/297,169 filed Aug. 29, 1994.

BACKGROUND OF THE INVENTION

1. Field of the Invention

The present invention relates to communication terminals for mutually transmitting image data, voice data, and the like and a communication conference system.

2. Related Background Art

Figure 3:
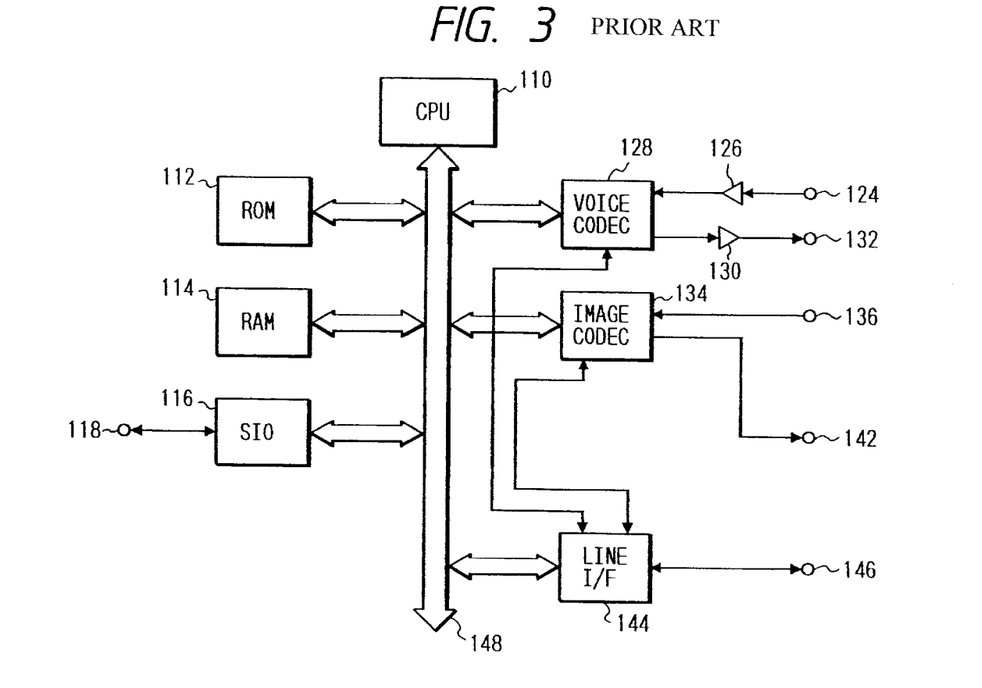
FIG. 3 is a block diagram showing the schematic arrangement of a conventional television conference apparatus.

FIG. 3 is a block diagram showing the schematic arrangement of a conventional television conference apparatus. A CPU 110 controls the overall apparatus. A ROM 112 stores programs executed by the CPU 110. A RAM 114 serves as the main memory of the CPU 110 and temporarily stores various data. An SIO 116 serves to perform serial communication between the CPU 110 and an operation apparatus (e.g., a keyboard, a mouse, or a coordinate input unit). An operation apparatus connection terminal 118 serves to connect an operation apparatus to the apparatus.

A microphone connection terminal 124 serves to connect a microphone to the apparatus. An amplifier 126 amplifies a voice signal from the microphone. A voice codec 128 codes/decodes a voice signal. An amplifier 130 amplifies an output signal from the voice codec 128. A speaker connection terminal 132 serves to connect a speaker to the apparatus.

An image codec 134 codes/decodes an image signal. A camera connection terminal 136 serves to connect a video camera to the apparatus. A monitor connection terminal 142 serves to connect a monitor to the apparatus.

A line I/F 144 is a signal matching interface to a communication line network. A communication line network connection terminal 146 serves to connect a communication line network to the apparatus. A CPU bus 148 serves to exchange data and control signals between the CPU 110 and a peripheral circuit.

Figure 4:
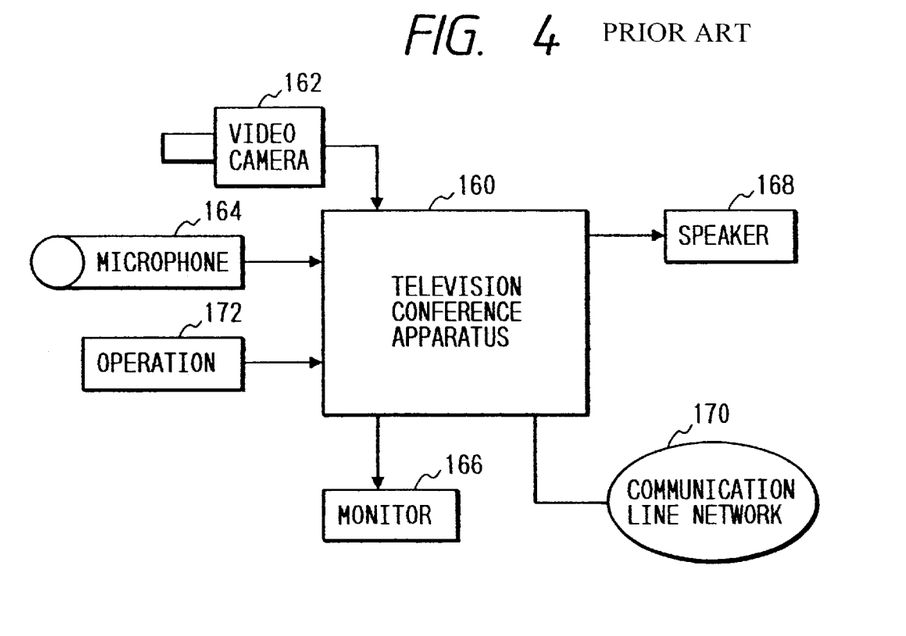
FIG. 4 is a schematic block diagram showing an arrangement in which peripheral devices are connected to the apparatus shown in FIG. 3.

FIG. 4 is a block diagram showing the schematic arrangement of a conventional terminal arrangement using the television conference apparatus shown in FIG. 3. A television conference apparatus 160 is identical to that shown in FIG. 3. A video camera 162 is used to photograph conference participants. A microphone 164 picks up voices produced by a conference participant. A monitor 166 displays an image. A speaker 168 outputs voices. This arrangement includes a communication line network 170 and an operation apparatus 172 used by an operator to operate the television conference apparatus 160.

The flows of signals in the above arrangement will be briefly described below. First of all, the operator operates the operation apparatus 172 to input the telephone number of a partner's station for which line connection is to be performed. The operation apparatus 172 outputs operation data corresponding to the operation performed by the operator, as serial data, to the SIO 116 of the television conference apparatus 160. The CPU 110 in the television conference apparatus 160 reads out the serial data from the register of the SIO 116 via the CPU bus 148 to recognize a line connection instruction from the operation apparatus 172. Upon recognition of the line connection instruction from the operator, the CPU 110 outputs a line connection instruction to the line I/F 144. The line I/F 144 outputs a communication line connection request in accordance with the line connection instruction from the CPU 110. The line I/F 144 waits for a line connection completion response from the communication line network 170 and receives this response signal. Thereafter, the line I/F 144 notifies the CPU 110 of the completion of line connection. With the above operation, line connection processing is completed with respect to the partner's station for which a television conference is to be held.

After line connection, image and voice data are mutually transmitted between the respective stations. Transmission processing will be described first.

An image signal obtained by photographing a conference participant using the video camera 162 is received by the television conference apparatus 160 via the camera connection terminal 136 and input to the image codec 134. The image codec 134 compresses/codes the input image signal, and outputs the coded image data or compressed image data to the line I/F 144.

A voice signal picked up from a conference participant by the microphone 164 is received by the television conference apparatus 160 via the microphone connection terminal 124 and amplified by the amplifier 126. Thereafter, the voice signal is input to the voice codec 128. The voice codec 128 compresses/codes the input voice signal, and outputs the coded voice data or compressed voice data to the line I/F 144.

The line I/F 144 converts the input compressed image and voice data into data conforming to communication line standards,.and outputs the data from the communication line network connection terminal 146 to the communication line network 170.

Reception processing will be described next. The data from the communication line network 170 is received by the television conference apparatus 160 via the communication line network connection terminal 146 and input to the line I/F 144. The line I/F 144 converts the input data into data conforming to the internal format employed by the apparatus. Thereafter, the line I/F 144 outputs information associated with the image to the image codec 134, and outputs information associated with the voice to the voice codec 128.

The image codec 134 decodes the data from the line I/F 144 to convert it into an analog signal, and outputs the analog image signal to the monitor 166 via the monitor connection terminal 142. With this operation, the received image is displayed on the screen of the monitor 166.

The voice codec 128 decodes the data from the line I/F 144 to convert it into an analog signal, and outputs the analog voice signal to the amplifier 130. The amplifier 130 amplifies the input voice signal, and outputs it to the speaker 168 via the speaker connection terminal 132. With this operation, the received voice is output from the speaker 168.

With the above processing, an image from the partner's station is displayed on the monitor screen, and a voice from the partner's station is output from the speaker.

In the conventional arrangement, communications between the self station and the partner's station are performed by using only image and voice data. For this reason, when conference participants meet for the first time, self-introduction is performed at first. In this case, each conference participant either memorizes the contents of self-introduction or writes them on paper or the like.

In addition, a person who participates-late in a conference either requests self-introduction from other conference participants or remains in the conference without knowing the names and posts of other conference participants.

Furthermore, the proceedings of a conference are manually formed by a conference participant after the end of the conference, similar to a conventional conference (a conference held in a room where conference participants gather).

In the conventional method of forming the proceedings of a television conference, the names, posts, and the like of the participants may be mistakenly input in forming the proceedings. Especially, the names of the conference participants are conveyed by voice, and hence may be mistakenly input.

In addition, if the television conference apparatus is connected to a multipoint television conference control apparatus, a television conference can be held upon connecting television conference apparatuses at two or more points (multipoints).

In a television conference using a conventional multipoint television conference control apparatus, a person can easily participate late in a conference as long as the multipoint television conference control apparatus has a free communication line. For this reason, if the date of a conference in which the user of a television conference apparatus is to participate is mistaken, the apparatus may be abruptly connected to a wrong conference.

SUMMARY OF THE INVENTION

It is an object of the present invention to provide a communication conference terminal and a communication conference system which can solve each or all of the above problems.

It is another object of the present invention to provide a communication conference terminal and a communication conference system which can easily acquire pieces of information about conference participants in other stations.

According to a preferred embodiment of the present invention, there is provided a communication conference terminal apparatus for holding a conference by using a plurality of communication conference terminals, comprising input means for inputting conference participant personal information, communication means for communicating the conference participant personal information input by the input means to a partner's communication conference terminal, and display means for displaying the conference participant personal information as visual information.

It is still another object of the present invention to provide a communication conference terminal and a communication conference system which can easily form the proceedings of a conference.

It is still another object of the present invention to provide a communication conference terminal and a communication conference system which allows easy recognition of the presence/absence of a participant in a conference.

It is still another object of the present invention to provide a communication conference terminal and a communication conference system which have novel functions.

Other objects and features of the invention will become apparent from the following detailed description of the embodiments taken in conjunction with the accompanying drawings.

DETAILED DESCRIPTION OF THE PREFERRED EMBODIMENTS

Embodiments of the present invention will be described below with reference to the accompanying drawings.

Figure 1:
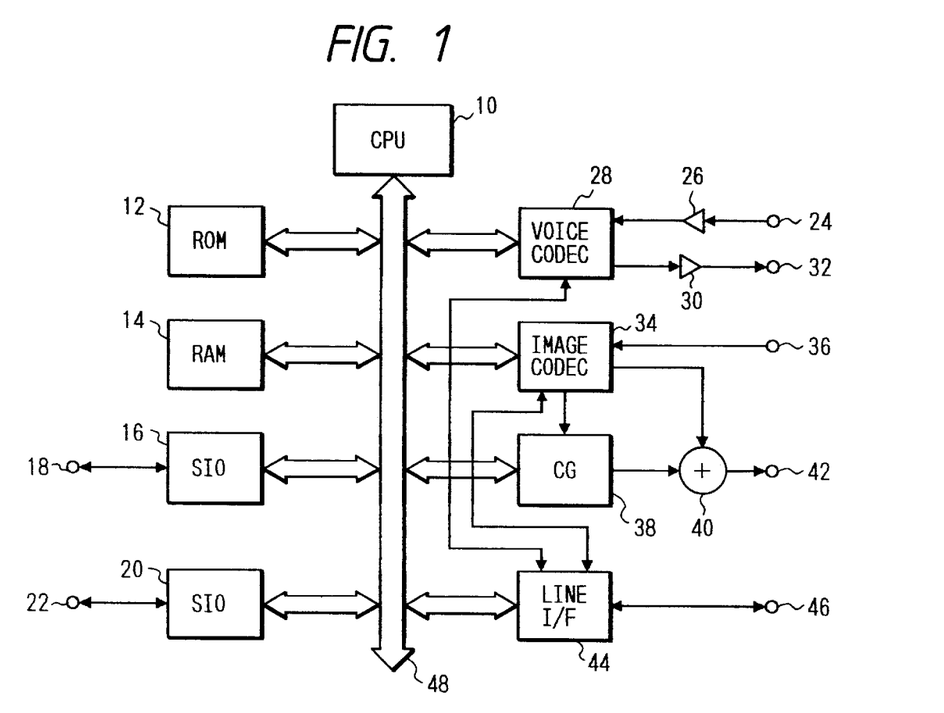
FIG. 1 is a block diagram showing the schematic arrangement of an embodiment of the present invention.

FIG. 1 is a block diagram showing the schematic arrangement of an embodiment of the present invention. A CPU 10 controls the overall apparatus. A ROM 12 stores programs executed by the CPU 10. A RAN 14 serves as the main memory of the CPU 10 and temporarily stores various data. An SIO 16 serves to perform serial communications between the CPU 10 and an operation apparatus (e.g., a keyboard, a mouse, or a coordinate input unit). An operation apparatus connection terminal 18 serves to connect an operation apparatus (to be described later) to the apparatus. An SIO 20 serves to perform serial communications with an external optical character reader (OCR). An OCR connection terminal 22 serves to connect the external OCR to the apparatus.

A microphone connection terminal 24 serves to connect a microphone to the apparatus. An amplifier 26 amplifies a voice signal from the microphone. A voice codec 28 codes/decodes a voice signal. An amplifier 30 amplifies an output signal from the voice codec 28. A speaker connection terminal 32 serves to connect a speaker to the apparatus.

An image codec 34 codes/decodes an image signal. A camera connection terminal 36 serves to connect a video camera to the apparatus. A character generator 38 generates a character image signal in synchronism with an image signal. An adder 40 superimposes a character image signal generated by the character generator 38 on an image signal output from the image codec 34. A monitor connection terminal 42 serves to connect a monitor to the apparatus.

A line I/F 44 is a signal matching interface to a communication line network. A communication line network connection terminal 46 serves to connect a communication line network to the apparatus. A CPU bus 48 serves to exchange data and control signals between the CPU 10 and peripheral circuits.

Figure 2:
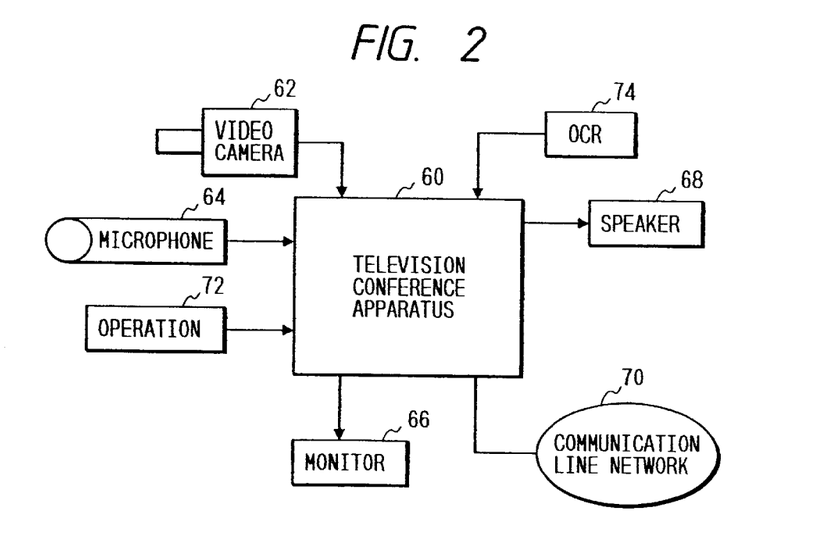
FIG. 2 is a schematic block diagram showing an arrangement in which peripheral devices are connected to the apparatus shown in FIG. 1.

FIG. 2 is a block diagram showing the schematic arrangement of a terminal arrangement using the television conference apparatus shown in FIG. 1. A television conference apparatus 60 is identical to that shown in FIG. 1. A video camera 62 is used to photograph a conference participant. A microphone 64 picks up voices generated by a conference participant. A monitor 66 displays images. A speaker 68 outputs voices. This arrangement includes a communication line network 70, an operation apparatus 72 used by an operator to operate the television conference apparatus 60, and an optical character reader (OCR) 74 for reading the name card data of a conference participant.

The above arrangement will be briefly described below. First of all, the operator operates the operation apparatus 72 to input the telephone number of a partner's station for which line connection is to be performed. The operation apparatus 72 outputs operation data corresponding to the operation performed by the operator, as serial data, to the SIO 16 of the television conference apparatus 60. The CPU 10 accesses the register of the SIO 16 via the character generator 38 to recognize a line connection instruction from the operation apparatus 72. Upon recognition of the line connection instruction from the operator, the CPU 10 outputs a line connection instruction to the line I/F 44. The line I/F 44 outputs a communication line connection request to the communication line network in accordance with the line connection instruction from the CPU 10. The line I/F 44 waits for a line connection completion response from the communication line network 70 and receives this response signal. Thereafter, the line I/F 44 notifies the CPU 10 of the completion of line connection. With the above operation, line connection processing is completed with respect to the partner's station for which a television conference is to be held.

After line connection, image and voice data are mutually transmitted between the respective stations, and pieces of conference participant proper-information are transmitted therebetween, as needed. Transmission processing will be described first.

An image signal obtained by photographing a conference participant using the video camera 62 is received by the television conference apparatus 60 via the camera connection terminal 36 and input to the image codec 34. The image codec 34 compresses/codes the input image signal, and outputs the coded image data or compressed image data to the line I/F 44.

A voice signal obtained by picking up a voice produced by the conference participant using the microphone 64 is received by the television conference apparatus 60 via the microphone connection terminal 24 and amplified by the amplifier 26. Thereafter, the voice signal is input to the voice codec 28. The voice codec 28 compresses/codes the input voice signal, and outputs the coded voice data or compressed voice data to the line I/F 44.

The OCR 74 serially outputs the read name card data of the conference participant to the OCR connection terminal 22 of the television conference apparatus 60. The SIO 20 of the television conference apparatus 60 sets the data, output from the OCR connection terminal 22, in an internal register. The CPU 10 reads out the name card data of the conference participant from the internal register of the SIO 20, and outputs it, as conference participant proper information, to the line I/F 44.

The line I/F 44 converts the input compressed image and voice data and the input conference participant proper information into data conforming to the communication line standards, and outputs the resultant data to the communication line network 70 via the communication line network connection terminal 46.

Reception processing will be described next. The data (the compressed image and voice data and the conference participant proper information) from the communication line network 70 are received by the television conference apparatus 60 via the communication line network connection terminal 46 and input to the line I/F 44. The line I/F 44 converts/separates the input data into data conforming to the internal format employed by the apparatus. Thereafter, the line I/F 44 outputs information associated with the image to the image codec 34; information associated with the voice, to the voice codec 28; and the conference participant proper information, to the CPU 10.

The image codec 34 decodes the image data from the line I/F 44 to convert it into an analog signal, and outputs the analog image signal obtained upon conversion to the adder 40. The CPU 10 transfers the conference participant proper information from the line I/F 44 to the character generator 38. The character generator 38 generates a character image signal corresponding to the input conference participant proper information in synchronism with a display sync signal from the image codec 34.

The adder 40 superimposes the character image signal from the character generator 38 on the image signal from the image codec 34, and outputs the resultant signal to the monitor 66 via the monitor connection terminal 42. With this operation, the received image and the conference participant proper information from the partner's station are displayed in a superimposed state on the screen of the monitor 66.

The voice codec 28 decodes the data from the line I/F 44 to convert it into an analog signal, and outputs the analog signal to the amplifier 30. The amplifier 30 amplifies the input voice signal, and outputs the amplified signal to the speaker 68 via the speaker connection terminal 32. As a result, the received voice is output from the speaker 68.

With the above processing, the image from the partner's station and the conference participant proper information of the communication partner are displayed on the monitor screen, while the voice is output from the speaker.

A conference participant proper information storage means and a conference participant proper information extraction means will be described next.

When one terminal is to be used by a plurality of conference participants, i.e., pieces of conference participant proper information are to be input by one OCR, a conference participant proper information storage means and a conference participant proper information extraction means are required. The conference participant proper information storage means serves to store data, obtained by reading, e.g., the name card of a conference participant using the OCR, in the television conference apparatus. The conference participant proper information extraction means serves to extract the name card data of an arbitrary conference participant from pieces of conference participant proper information stored in the conference participant proper information storage means. Note that the above name card has a company name, a post, and the like written at specific positions, as shown in FIGS. 5 and 6 (to be described later).

Before a conference is started, each conference participant causes the OCR 74 to optically scan the contents of his/her name card so as to read the printed contents. The OCR 74 serially outputs the read name card data of the conference participant to the OCR connection terminal 22 of the television conference apparatus 60. In the television conference apparatus 60, the data from the OCR connection terminal 22 is set in the internal register of the SIO 20. The CPU 10 accesses the internal register to read out the name card name of the conference participant, and stores it, as conference participant proper information, in the RAM 14.

Figure 5:
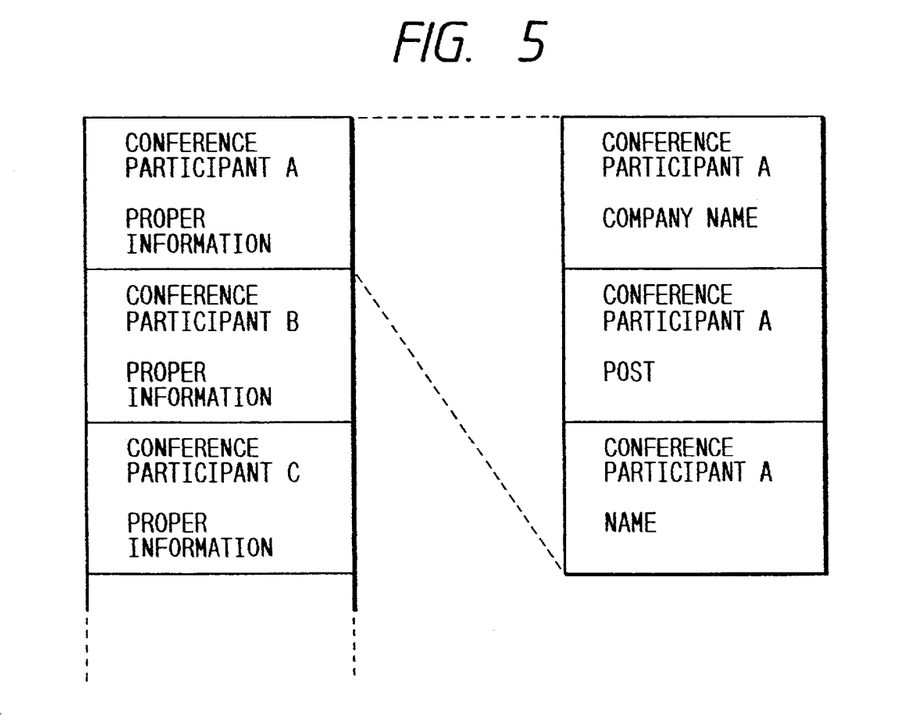
FIG. 5 is a view showing a memory map for conference participant proper information.

FIG. 5 shows the contents of a conference participant proper information table stored in the RAM 14. Each conference participant proper information consists of the fixed-length fields of a company name, a post, and a name. The CPU 10 stores the proper information (company name, post, and name) of each conference participant in the storage area of conference participant proper information preset in the RAM 14.

Figure 6:
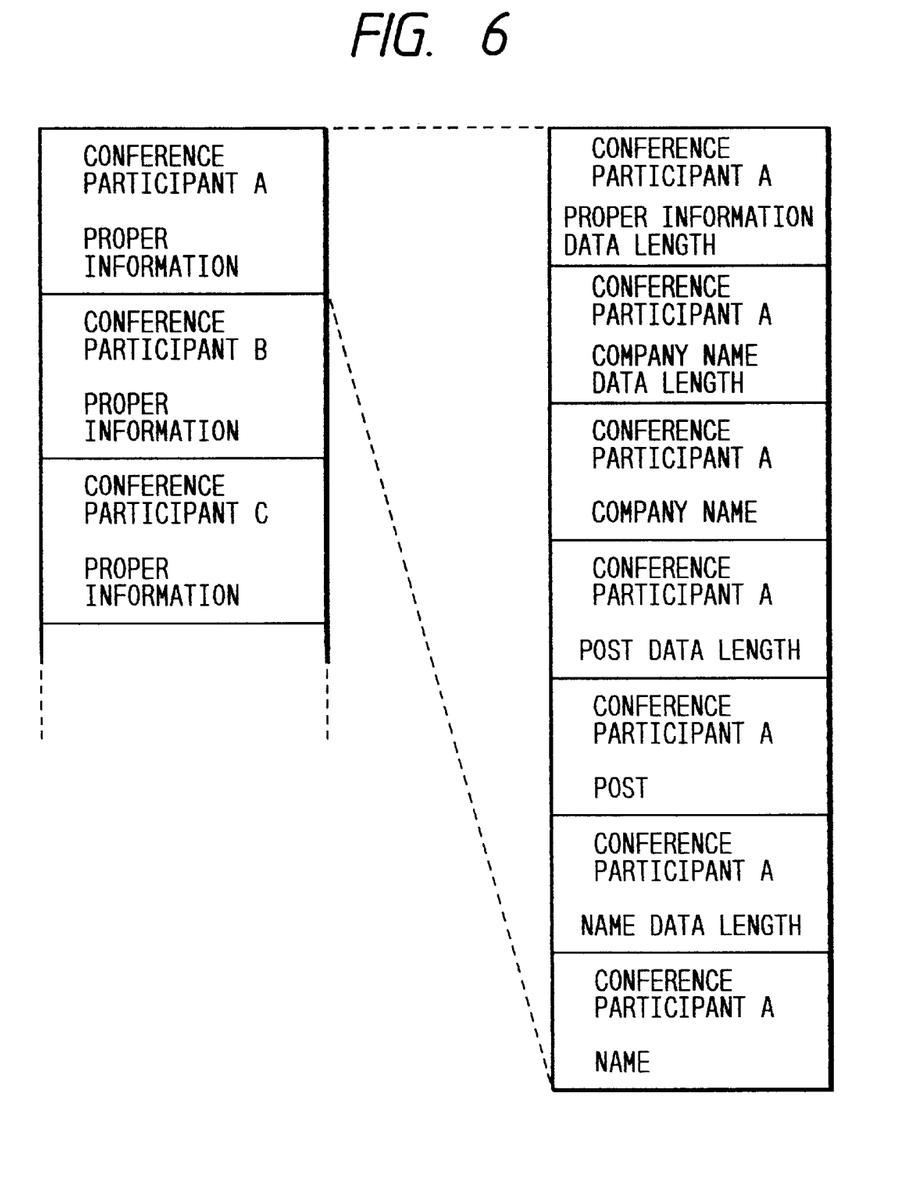
FIG. 6 is a view showing another memory map for conference participant proper information.

FIG. 6 shows another storage format of conference participant proper information in the RAM 14. A company name, a post, and a name are generally variable-length data. If, therefore, these data are to be managed by a fixed-length scheme, an unused portion is produced in a data storage area. By adding information indicating a data length in front of each data, the company name, post, and name of each conference participant proper information can be stored in the RAM 14 without considering the data length of each data. This method is generally employed to handle variable-length data. Instead of adding information indicating data lengths, delimiters for delimiting columns or records may be added.

The CPU 10 can read out arbitrary conference participant proper information from the RAM 14 via the CPU bus 48. The CPU 10 transfers the read conference participant proper information to the line I/F 44. This conference participant proper information is transmitted to the partner's station after the same processing as that described above.

An arrangement, will be described next, in which a means for discriminating a target participant (to be photographed) is arranged to transmit the proper information of a discriminated participant to a partner's station.

Figure 7:
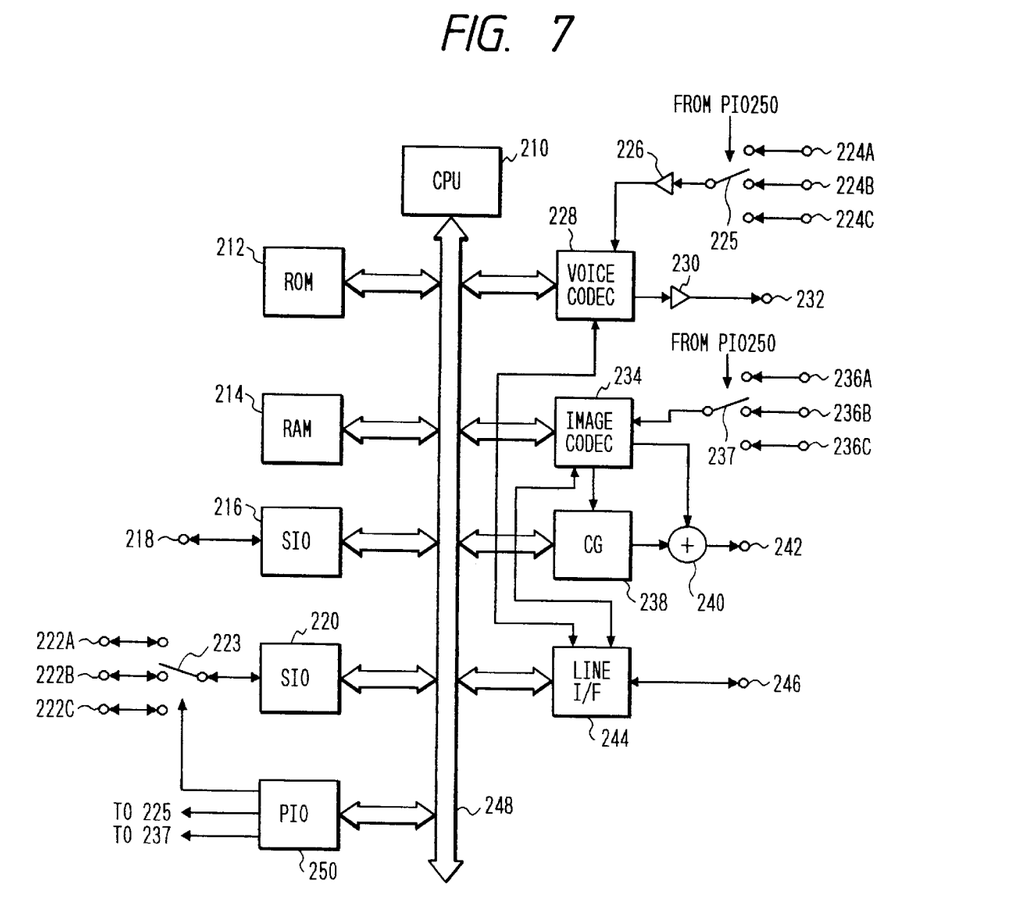
FIG. 7 is a block diagram showing the schematic arrangement of the second embodiment of the present invention.

FIG. 7 is a block diagram showing the schematic arrangement of an embodiment of the present invention, which can handle three conference participants. A CPU 210 controls the overall apparatus. Programs executed by the CPU 210 are stored in a ROM 212. A RAM 214 serves as the main memory of the CPU 210 and temporarily stores various data. An SIO 216 is used to perform serial communications between the CPU 210 and an operation apparatus (e.g., a keyboard, a mouse, or an coordinate input unit). An operation apparatus connection terminal 218 serves to connect the operation apparatus to the apparatus. An SIO 220 is used to perform serial communications between an external optical character reader (OCR) unit and the apparatus. OCR connection terminals 222A to 222C serve-to connect external OCRs to the apparatus. A selection switch 223 is used to selectively supply data from the OCR connection terminals 222A to 222C to the SIO 220.

Microphone connection terminals 224A to 224C serve to connect microphones to the apparatus. A selection switch 225 is used to select one of voice signals from the microphone connection terminals 224A to 224C. An amplifier 226 amplifies a voice signal from the selection switch 225. A voice codec 228 codes/decodes a voice signal. An amplifier 230 amplifies an output signal from the voice codec 228. A speaker connection terminal 232 serves to connect a speaker to the apparatus.

An image codec 234 codes/decodes an image signal. Camera connection terminals 236A to 236C serve to connect to video cameras to the apparatus. A selection switch 237 is used to select one of image signals from the camera connection terminals 236A to 236C and supply the selected signal to the image codec 234. A character generator 238 generates a character image signal in synchronism with an image signal. An adder 240 superimposes a character image signal generated by the character generator 238 on an image signal output from the image codec 234. A monitor connection terminal 242 serves to connect a monitor to the apparatus.

A line I/F 244 is a signal matching interface to a communication line network. A communication line network connection terminal 246 serves to connect the communication line network to the apparatus. A CPU bus 248 serves to exchange data and control signals between the CPU 210 and peripheral circuits.

A PIO (parallel interface) 250 allows the CPU 210 to control selection switches 223, 225, and 237.

Figure 8:
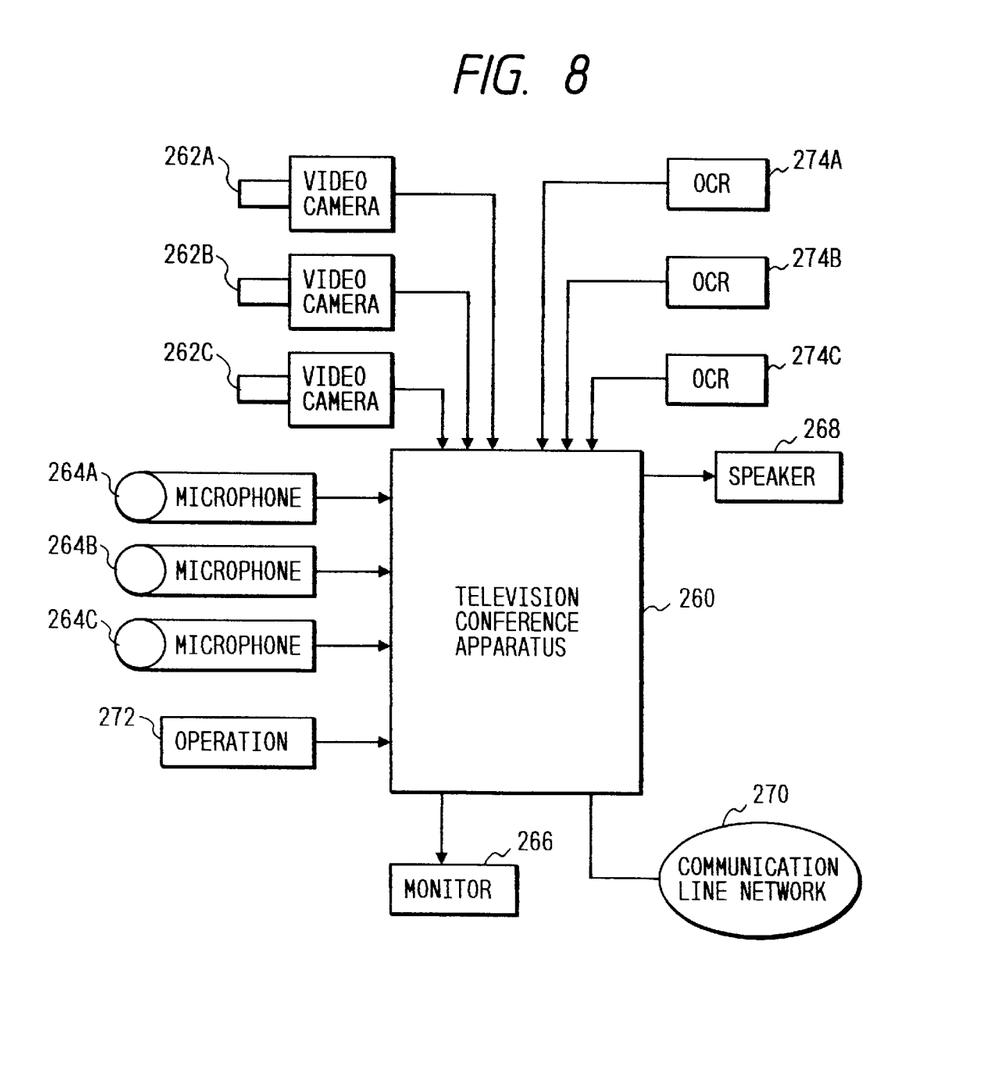
FIG. 8 is a schematic block diagram showing an arrangement in which peripheral devices are connected to the apparatus shown in FIG. 7.

FIG. 8 is a block diagram showing the schematic arrangement of a terminal arrangement using the television conference apparatus shown in FIG. 7. A television conference apparatus 260 is identical to that shown in FIG. 7. Video cameras 262A to 262C are respectively used to photograph conference participants A, B, and C. Microphones 264A to 264C are respectively used to pick up voices produced by the conference participants A, B, and C. A monitor 266 displays images. A speaker 268 outputs voices. This arrangement also includes a communication line network 270, an operation apparatus 272 used by an operator to operate the television conference apparatus 260, and optical character readers (OCRs) 274A to 274C for respectively reading the name card data of the conference participants A, B, and C.

Figure 9:
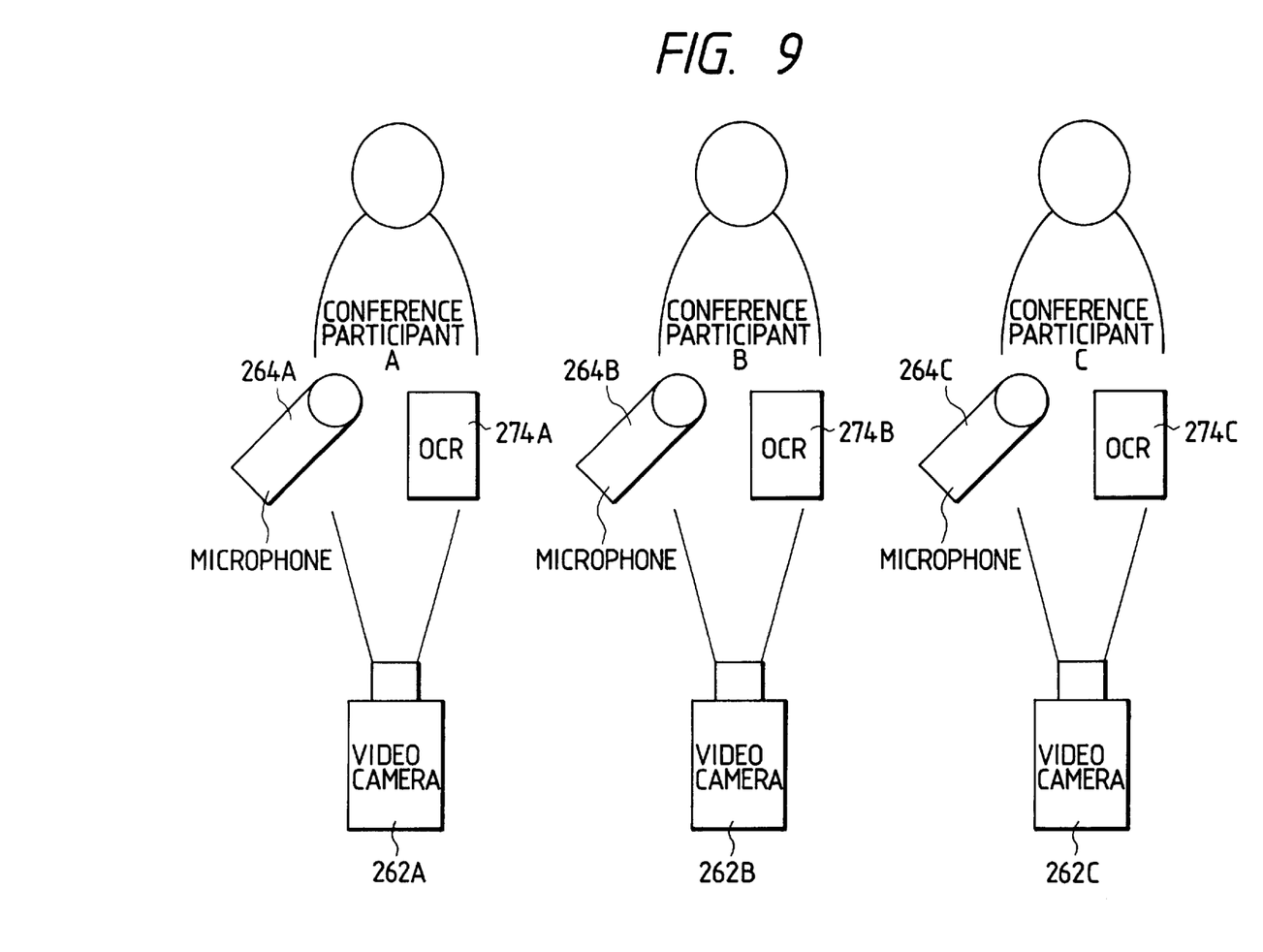
FIG. 9 is a block diagram showing the positions of video cameras 262A, 262B, and 262C, microphones 264A, 264B, and 264C, and OCRs 274A, 274B, and 274C with respect to conference participants A, B, and C.

FIG. 9 shows the positions of the video cameras 262A to 262C, the microphones 264A to 264C, and the OCRs 274A to 274C with respect to the conference participants A, B, and C. The microphones 264A to 264C and the OCRs 274A to 274C are arranged in front of the conference participants A, B, and C, respectively, whereas the video cameras 262A to 262C are positioned to exclusively photograph the conference participants A, B, and C, respectively.

With the arrangement shown in FIGS. 7, 8, and 9, target participants are discriminated, and the proper information of each conference participant who is discriminated as a target participant is transmitted to a partner's station. This operation will be described below.

By operating the operation apparatus 272, the operator can select which one of the conference participants A, B, and C is photographed, and the resultant image is transmitted. Assume that the operator operates the operation apparatus 272 to transmit an image of the conference participant A. In this case, the operation apparatus 272 outputs operation data corresponding to the operation performed by the operator, as serial data, to the SIO 216 of the television conference apparatus 260. The SIO 216 stores the input data in an internal register. The CPU 210 reads out the stored contents of the internal register of the SIO 216 via the CPU bus 248 to recognize a photographing instruction issued by the operator with respect to the conference participant A.

In this manner, the CPU 210 determines that the conference participant A is a target participant. The CPU 210 then sets the internal circuit to photograph the conference participant A. More specifically, the CPU 210 controls the selection switches 223, 225, and 237 via the PIO 250 to connect the selection switch 223 to the OCR connection terminal 222A; the selection switch 225, to the microphone connection terminal 224A; and the selection switch 237, to the camera connection terminal 236A.

An image signal obtained by photographing the conference participant A using the video camera 262A is received by the television conference apparatus 260 via the camera connection terminal 236A and input to the image codec 234 via the selection switch 237. The image codec 234 compresses/codes the input image signal, and outputs the coded image data or compressed image data to the line I/F 244.

A voice signal obtained by picking up a voice produced by the conference participant A using the microphone 264A is received by the television conference apparatus 260 via the microphone connection terminal 224A and input to the voice codec 228 via the selection switch 225 and the amplifier 226. The voice codec 228 compresses/codes the input voice signal, and outputs the coded voice data or compressed voice data to the line I/F 244.

The OCR 274A serially outputs the read name card data of the conference participant A to the OCR connection terminal 222A of the television conference apparatus 260. The data input to the OCR connection terminal 222A is input to the SIO 220 of the television conference apparatus 260 via the selection switch 223. The SIO 220 sets the input data in an internal register. The CPU 210 reads out the name card data of the conference participant A from the internal register of the SIO 220, and outputs the data, as the proper information of a target participant, to the line I/F 244.

The line I/F 244 converts the input compressed image and voice data and the input proper information of the target participant into data conforming to the communication line standards. Thereafter, the line I/F 244 outputs the resultant data from the communication line network connection terminal 246 to the communication line network 270.

With the above processing, the image information, voice information, and proper information of the target participant are transmitted to the partner's station.

Reception processing will be described next. The data (the compressed image and voice data and the proper information of the target participant) from the communication line network 270 are received by the television conference apparatus 260 via the communication line network connection terminal 246 of the terminal of the partner's station. The data are input to the line I/F 244. The line I/F 244 converts the input data into data conforming to the internal format employed by the apparatus. Thereafter, the line I/F 244 outputs information associated with the image to the image codec 234; information associated with voice, to the voice codec 228; and the proper information of the target participant, to the CPU 210.

The image codec 234 decodes the data from the line I/F 244 to convert it into an analog signal, and outputs the analog image signal to the adder 240. The CPU 210 transfers the proper information of the target participant from the line I/F 244 to the character generator 238. The character generator 238 generates a character image signal corresponding to the input proper information of the target participant in synchronism with a display sync signal from the image codec 234.

The adder 240 superimposes the character image signal from the character generator 238 on the image signal from the image codec 234, and outputs the resultant signal to the monitor 266 via the monitor connection terminal 242. As a result, the received image (the image of the target participant) and the name card data are displayed on the screen of the monitor 266.

The voice codec 228 decodes the data from the line I/F 244 to convert it into an analog signal, and outputs the analog signal to the amplifier 230. The amplifier 230 amplifies the input voice signal, and outputs the amplified signal to the speaker 268 via the speaker connection terminal 232. As a result, the received voice is output from the speaker 268.

With the above processing, the image and name card data from the partner's station are displayed on the monitor screen, and the voice is output from the speaker.

When one terminal is used by a plurality of conference participants, a target participant is sometimes or frequently changed. Every time a target participant is changed, the name card data of the corresponding participant may be read by an OCR to be transmitted to a partner's station. Alternatively, the name cards of all conference participants may be read in advance so that every time a target participant is changed, the name card data of the new target participant can be extracted to be transmitted to a partner's station. In the above operation form, the latter method is more efficient.

When each conference participant takes his/her seat, he/she inserts his/her name card in the OCR set in front of him/her to let the OCR read the name card.

Assume that the conference participant A inserts his/her name card in the OCR 274A to let it read the printed contents. The OCR 274 serially outputs the read name card data of the conference participant A to the OCR connection terminal 222A of the television conference apparatus 260. In the television conference apparatus 260, the CPU 210 connects the selection switch 223 to the OCR connection terminal 222A via the PIO 250, so that an output from the OCR 274A is input to the SIO 220 via the selection switch 223. The SIO 220 sets the data read by the OCR 274A and sent from the selection switch 223 in the internal register. The CPU 210 reads out the name card data of the conference participant from the internal register of the SIO 220, and stores it, as conference participant proper information, in the RAM 214, as shown in FIG. 5 or 6.

The CPU 210 sequentially switches the selection switch 223 to the OCR connection terminals 222B and 222C to store the name card data of the conference participants B and C, respectively read by the OCRs 274B and 274C, in the RAM 214 via the SIO 220.

In this manner, the name card data, i.e., pieces of proper information, of the conference participants A, B, and C are stored in the RAM 214.

The CPU 210 can read out arbitrary conference participant proper information from the RAM 214 via the CPU bus 248. The CPU 210 extracts the proper information of a new target participant every time a target participant is changed, and transfers the read data, as the proper information of the target participant, to the line I/F 244. This proper information of the target participant is transmitted to the partner's station after the same processing as that described above.

When one terminal is used by a plurality of conference participants, a target participant is sometimes or frequently changed. Every time a target participant is changed, the name card data of the corresponding participant may be read by an OCR to be transmitted to a partner's station. Instead of performing such an operation, the pieces of proper information of all conference participants may be transmitted to the partner's station, together with ID codes specifying the respective conference participants, immediately after line connection is performed. In this method, every time a target participant is changed during the conference, the ID code (target participant code) of the new target participant is transmitted to the partner's station.

Figure 10:
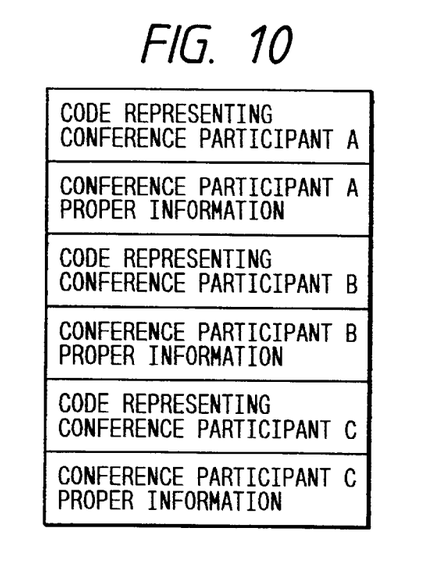
FIG. 10 is a view showing a memory map for conference participant proper information.

Transmission/reception processing of a target participant code will be described next. Assume that the pieces of proper information of all the conference participants A, B, and C using the terminal are stored in the RAM 214, as described above. The CPU 210 reads out the pieces of conference participant proper information from the RAM 214. Thereafter, as shown in FIG. 10, the CPU 210 adds codes specifying the conference participants to the pieces of conference participant proper information, and transmits the resultant pieces of information to the partner's station via the line I/F 244. This transmission is executed immediately after line connection is performed, or every time a new conference participant participates in the conference or takes his/her seat. The partner's station stores the received pieces of conference participant proper information and code information in the RAN 214.

Every time a target participant is changed during the conference, the CPU 210 transmits a code specifying the new target participant, i.e., a target participant code, to the partner's station. The partner's station retrieves conference participant proper information having a code coinciding with the received target participant code from the RAM 214, and transfers the retrieved conference participant proper information to the character generator 238.

The character generator 238 generates a character image signal corresponding to the input conference participant proper information in synchronism with a display sync signal from the image codec 234. The adder 240 superimposes the character image signal from the character generator 238 on the image signal from the image codec 234, and outputs the resultant signal to the monitor 266 via the monitor connection terminal 242. With this operation, the received image (the image of the target participant) and the name card data are displayed on the screen of the monitor 266.

As is apparent from the above description, according to this embodiment, since the name of a communication partner can be known at a glance, a smooth progress of a conference can be realized. The name, post, and the like of a person who participates late in a conference can be notified to other participants without self-introduction. These advantages of the embodiment allow an efficient progress of a conference and achieve a reduction in communication cost.

In addition, after a television conference, the CPU 10 reads out pieces of conference participant proper information read by the OCR 74 and the pieces of conference participant proper information of communication partners, which have been received from a partner's station and stored, from the RAM 14. The read name card data of the conference participants are converted into serial data and sent to the operation apparatus 72 (e.g., a personal computer) via the SIO 16. The operation apparatus 72 forms a proceedings sheet format having the name card data written in a participant list. The operator forms the detailed proceedings of the conference by using this proceedings sheet and a wordprocessor or the like.

Since the conference participants are recorded on the proceedings by using the conference participant proper information, accurate proceedings can be easily formed without checking the presence/absence of conference participants.

Another embodiment of the present invention will be described below with reference to FIG. 12, which is a block diagram showing the schematic arrangement of a multipoint television conference control apparatus.

Figure 11:
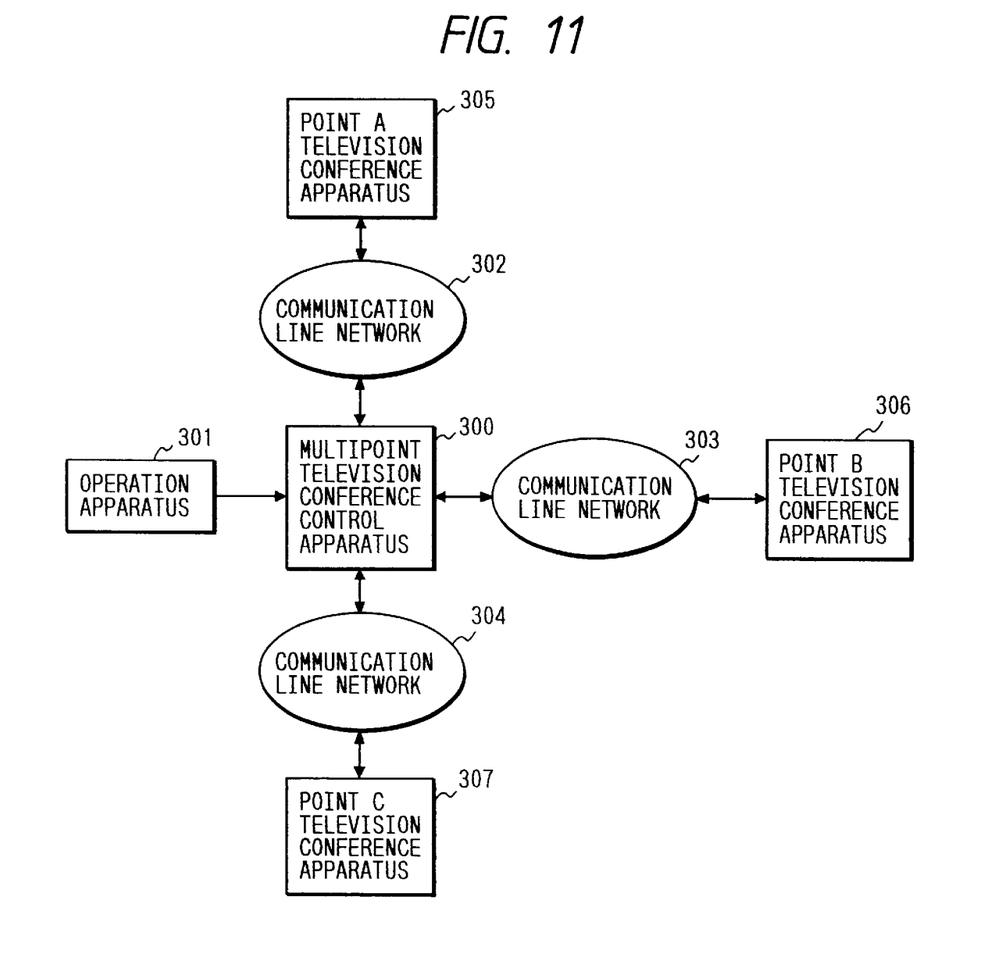
FIG. 11 is a block diagram showing a case wherein television conference apparatuses at three points are connected to perform a multipoint television conference.

FIG. 11 shows an arrangement in which television conference apparatuses at three points are connected to the multipoint television conference control apparatus. Referring to FIG. 11, this arrangement includes a multipoint television conference control apparatus 300, an operation apparatus 301 (e.g., a personal computer) for issuing an operation command to the multipoint television conference control apparatus, communication line networks 302 to 304, a point A television conference apparatus 305, a point B television conference apparatus 306, and a point C television conference apparatus 307.

The television conference apparatuses at the respective points can hold a multipoint television conference by connecting the television conference apparatuses to the communication lines of the multipoint television conference control apparatus 300 via communication line networks. In this case, the number of points which can be connected is determined by the number of channels of television conference apparatuses to which the multipoint television conference control apparatus can be connected.

Figure 12:
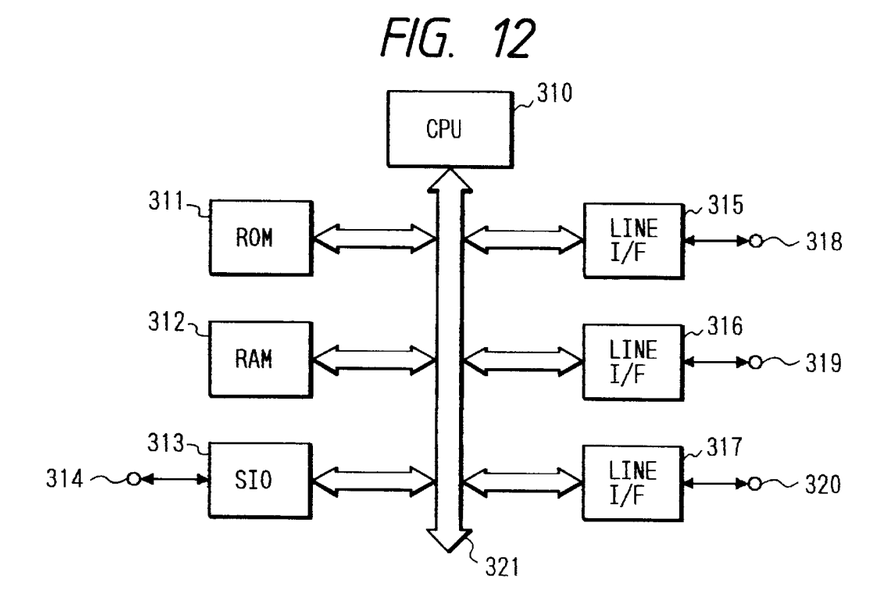
FIG. 12 is a block diagram showing the schematic arrangement of a multipoint television conference control apparatus.

Referring to FIG. 12, a CPU 310 controls the multipoint television conference control apparatus. A ROM 311 serves to store programs executed by the CPU 310. A RAM 312 serves as the main memory of the CPU 310 and temporarily stores various data. An SIO 313 is used for serial communications between the CPU 310 and the externally connected operation apparatus 301 (e.g., a personal computer). An operation apparatus connection terminal 314 serves to connect the operation apparatus to the control apparatus. Line I/Fs 315 to 317 are signal matching interfaces to communication line networks. Communication line network connection terminals 318 to 320 serve to connect the communication line networks to the control apparatus. A CPU bus 321 serves to exchange data and control signals between the CPU 310 and peripheral circuits.

In this case, the number of lines which can be connected to the multipoint television conference control apparatus is assumed to be three. However, the number of lines which can be connected to the control apparatus can be increased by increasing the numbers of line I/Fs and communication line network connection terminals.

A conference schedule and persons who can participate in each conference are registered by the operation apparatus 301. The operation apparatus 301 converts input conference schedule data and conference participant data into serial data, and inputs the data to the multipoint television conference control apparatus 300. The multipoint television conference control apparatus 300 receives the serial data from the operation apparatus connection terminal 314 and inputs the data to the SIO 313. The CPU 310 accesses the register data of the SIO 313 via the CPU bus 321 to recognize the conference schedule and the participants in each conference, which are input from the operation apparatus 301. The CPU 310 stores the conference schedule data and the conference participant data in the RAM 312 via the CPU bus 321.

The multipoint television conference control apparatus and the respective television conference apparatuses are connected to each other via communication line networks. Procedures for connecting the A point television conference apparatus 305 and the B point television conference apparatus 306 to the multipoint television conference control apparatus will be described below. Assume that each of the television conference apparatuses used in the following description is identical to that shown in FIGS. 1 and 2.

First of all, the operator lets the television conference apparatus 60 read his/her name card by using the OCR 74 before inputting a telephone number by using the operation apparatus 72. The operator then operates the operation apparatus 72 to input the telephone number of the multipoint television conference control apparatus 300. The operation apparatus 72 outputs operation data corresponding to the operation performed by the operator, as serial data, to the SIO 16 of the television conference apparatus 60. The CPU 10 reads out the stored contents of the register of the SIO 16 via the CPU bus 48 to recognize a line connection instruction from the operation apparatus 72. Upon recognition of the line connection instruction from the operator, the CPU 10 outputs a line connection instruction to the line I/F 44. The line I/F 44 outputs a communication line connection request to a communication line network in response to the line connection instruction from the CPU 10. The line I/F 44 waits for a line connection completion response from the communication line network 302. Upon reception of this response signal, the line I/F 44 notifies the CPU 10 of the completion of line connection. With the above operation, connection between the A point television conference apparatus 305 and the multipoint television conference control apparatus 300 is completed.

Upon completion of communication line connection to the multipoint television conference control apparatus 300, the A point television conference apparatus 305 transmits the name card data of the operator, which has been read in advance, to the multipoint television conference control apparatus 300. The multipoint television conference control apparatus 300 compares the received name card data of the operator of the A point television conference apparatus 305 with the data of participants in a conference to be currently held, which data is stored in the RAM 312 in advance. If the two data coincide with each other, the multipoint television conference control apparatus 300 permits the operator to participate in the conference. Otherwise, the multipoint television conference control apparatus 300 inhibits the operator from participating in the conference.

The same processing as described above is performed with respect to the B point television conference apparatus 306. If both the operators of the A and B point television conference apparatuses 305 and 306 are permitted to participate in the conference, a television conference can be held between the A point television conference apparatus 305 and the B point television conference apparatus 306.

Assume that the operator of the C point television conference apparatus 307 participates late in the conference currently held between the points A and B. In this case, the operator connects the C point television conference apparatus 307 to the multipoint television conference control apparatus 300 via a communication line by the same method as described above. If the multipoint television conference control apparatus 300 permits the operator of the C point television conference apparatus 307 to participate in the conference, a television conference can be held between three points.

In the above description, a conference schedule and participants in each conference are registered by using the operation apparatus 301 connected to the multipoint television conference control apparatus 300. However, these data can be registered by a method of inputting data using an operation section on the multipoint television conference control apparatus or a method of registering data by means of communication from the television conference apparatuses at the respective points.

As is apparent from the above description, according to this embodiment, connection of an unregistered person to a television conference can be rejected. Therefore, connection of a person to a wrong conference can be prevented, and conference participants are free from trouble caused by wrong connection.

In the above embodiment, conference participant proper information is input by using a name card. However, the present invention is not limited to this. For example, conference participant proper information may be input by using an ID card such as a magnetic card or an optical card and using a special reader (e.g., a magnetic reader for a magnetic card) instead of the OCR.

What is claimed is:

1. A communication conference system for carrying out a communication conference between a plurality of terminals, said system comprising:

an input unit, arranged to input conference participant personal data representing participants at respective ones of the plurality of terminals participating in the communication conference upon conference participation by each of the participants at a respective terminal, wherein said input unit is enabled to input conference participant personal data for one or more of the participants at a time when the one or more of the participants join the communication conference, wherein said input unit enables a participant to join the communication conference at any time from a beginning of the communication conference to an end of the communication conference, and wherein the conference participant personal data is provided to the participants in the conference as visual information for visual confirmation by the participants in a form usable in conference minutes;

a data processor, arranged to form conference minutes by using the conference participant personal data; and an image reader, arranged to input the conference participant personal data to said input unit.

2. A communication system according to claim 1, further comprising a transmitter, arranged to transmit the conference minutes formed by said data processor.

3. A communications system according to claim 1, wherein said input unit performs inputting by communication.

4. A communication system according to claim 1, wherein the conference participant personal data includes data representing a name of a company to which a participant belongs or a post or a name of a participant.

5. A communication system according to claim 1, wherein the conference participant personal data includes data of a user used for certifying whether participation by that user is permitted or not.

6. A communication system according to claim 1, wherein the conference personal participant data is inputted from each terminal by said input unit.

7. A communication system according to claim 1, wherein said image reader is an OCR.

8. A communication conference terminal apparatus for holding a conference with another communication conference terminal, said apparatus comprising:

a receiver for receiving, from the other communication conference terminal, conference participant personal information of a participant at the other communication conference terminal and image information of a current image of the participant currently being picked-up at the other communication conference terminal, wherein the terminal apparatus enables a participant at the terminal apparatus and a participant at the other communication conference terminal to join the conference at any time from a beginning of the conference to an end of the conference;

a display for displaying the conference participant personal information correlated with the image information as visual information for visual confirmation by the participant at the terminal apparatus in a form usable for conference minutes; and an image reader, arranged to input the conference participant personal data, wherein the terminal apparatus uses the conference participant personal data for forming conference minutes of the conference.

9. An apparatus according to claim 8, wherein said display synthesizes and displays the conference participant personal information and the image information.

10. An apparatus according to claim 8, further comprising a receiver for receiving voice information from the other communication conference terminal.

11. A communication system according to claim 8, wherein the conference participant personal data includes data representing a name of a company to which the participant corresponding to the conference participant personal data belongs or a post or a name of that participant.

12. An apparatus according to claim 8, wherein said image reader is an OCR.

13. A method of operating a communication conference terminal apparatus for holding a conference with another communication conference terminal, said method comprising the steps of:

receiving, from the other communication conference terminal, conference participant personal information of a participant at the other communication conference terminal and image information of a current image of the participant currently being picked-up at the other communication conference terminal, wherein the terminal apparatus enables a participant at the terminal apparatus and a participant at the other communication conference terminal to join the conference at any time from a beginning of the conference to an end of the conference;

displaying the conference participant personal information correlated with the image information as visual information for visual confirmation by the participant at the terminal apparatus in a form usable for conference minutes; and inputting the conference participant personal data using an image reader, wherein the terminal apparatus uses the conference participant personal data for forming conference minutes of the conference.

14. A method according to claim 13, wherein said displaying step synthesizes and displays the conference participant personal information and the image information.

15. A method according to claim 13, further comprising the step of receiving voice information from the other communication conference terminal.

16. A method according to claim 13, wherein the conference participant personal information includes a name of a company to which the participant corresponding to the conference participant personal information belongs or a post or a name of that participant.

17. A method according to claim 13, wherein the image reader is an OCR.

18. A method of operating a communication conference system for carrying out a communication conference between a plurality of terminals, said method comprising the steps of:

inputting, using an image reader, conference participant personal data representing participants at respective ones of the plurality of terminals participating in the communication conference upon conference participation by each of the participants at their respective terminal, wherein said inputting step is enabled to input conference participant personal data for one or more of the participants at a time when the one or more participants join the communication conference, wherein said inputting step allows a participant to join the communication conference at any time from a beginning of the communication conference to an end of the communication conference, and wherein the conference participant personal data is provided to the participants in the conference as visual information for visual confirmation by the participants in a form usable in conference minutes; and forming conference minutes by using the conference participant personal data.

19. A method according to claim 18, further comprising the step of transmitting the conference minutes formed in said forming step.

20. A method according to claim 18, wherein the conference participant personal data is provided in said forming step in a communication from respective ones of the plurality of terminals.

21. A method according to claim 18, wherein the conference participant personal data includes data representing a name of a company to which a participant belongs or a post or a name of a participant.

22. A method according to claim 18, wherein the conference participant personal data includes data of a user used for certifying whether participation by that user is permitted or not.

23. A method according to claim 18, wherein the conference participant personal data is inputted from each of the plurality of terminals in said inputting step.

24. A method according to claim 18, wherein the image reader is an OCR.

* * * * *

UNITED STATES PATENT AND TRADEMARK OFFICE
CERTIFICATE OF CORRECTION

PATENT NO. : 6,353,456 B1
DATED : March 5, 2002
INVENTOR(S) : Eiichi Sato

It is certified that error appears in the above-identified patent and that said Letters Patent is hereby corrected as shown below:

<u>Title page,</u>
Item [56], References Cited,

U.S. PATENT DOCUMENTS,
Insert -- 5,216,517    6/1993    Kinoshita et al.
         4,965,819    10/1990   Kannes --.

FOREIGN PATENT DOCUMENTS
Insert -- JP 62-67956  3/1987
         JP 3-165368  7/1991
         JP 3-201658  9/1991
         JP 4-360493  12/1992 --.

<u>Column 1,</u>
Line 4, "continuation," should read -- continuation --.

<u>Column 2,</u>
Line 29, "standards,. and" should read -- standards, and --.
Line 64, "participates-late" should read -- participates late --.

<u>Column 4,</u>
Line 37, "RAN" should read -- RAM --.

Signed and Sealed this

Tenth Day of September, 2002

Attest:

JAMES E. ROGAN
*Attesting Officer*        *Director of the United States Patent and Trademark Office*